(12) United States Patent
DeLuca et al.

(10) Patent No.: US 10,693,984 B2
(45) Date of Patent: Jun. 23, 2020

(54) AUTOMATED MOBILE DEVICE NOTIFICATION ROUTING

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 15/816,146

(22) Filed: Nov. 17, 2017

(65) Prior Publication Data

US 2019/0158615 A1  May 23, 2019

(51) Int. Cl.
*H04L 29/08* (2006.01)
*G06N 5/02* (2006.01)

(52) U.S. Cl.
CPC ............ *H04L 67/26* (2013.01); *G06N 5/022* (2013.01); *H04L 67/18* (2013.01); *H04L 67/2804* (2013.01); *H04L 67/306* (2013.01); *H04L 67/32* (2013.01)

(58) Field of Classification Search
CPC ..... H04L 67/26; H04L 67/18; H04L 67/2804; H04L 67/306; H04L 67/32; G06N 5/022
USPC ........................................................ 709/204
See application file for complete search history.

(56) References Cited

U.S. PATENT DOCUMENTS

| | | | |
|---|---|---|---|
| 7,986,704 B2 * | 7/2011 | Karaoguz | H04L 12/18 370/401 |
| 9,292,832 B2 | 3/2016 | Goel et al. | |
| 9,462,570 B1 * | 10/2016 | Bostick | G06F 17/2705 |
| 2002/0120744 A1 | 8/2002 | Chellis et al. | |
| 2002/0191539 A1 | 12/2002 | Rawlins et al. | |
| 2004/0010437 A1 | 1/2004 | Kiran et al. | |
| 2012/0303774 A1 * | 11/2012 | Wilson | H04L 67/26 709/223 |

(Continued)

FOREIGN PATENT DOCUMENTS

JP 2016526310 9/2016

OTHER PUBLICATIONS

Lysis Platform; Introducing the Ultimate Platform of the Social Internet of Things; URL: http://www.lysis-iot.com/; retrieved from the Internet Feb. 16, 2017; 3 pages.

(Continued)

*Primary Examiner* — Nicholas R Taylor
*Assistant Examiner* — Chong G Kim
(74) *Attorney, Agent, or Firm* — Schmeiser, Olsen & Watts; Isaac J. Gooshaw

(57) ABSTRACT

A method and system for improving a mobile device notification is provided. The method includes receiving notification routing data associated with routing notifications to a plurality of hardware devices of a user. A list describing hardware devices of the user is received and specified notifications of the routing notifications are associated with specified devices of the plurality of hardware devices. A request for transmitting a notification to the user is received and content of the notification is analyzed. Results of the analysis are associated with the list describing hardware devices of the user and the notification is transmitted to a specified hardware device of the plurality of hardware devices.

20 Claims, 7 Drawing Sheets

(56) References Cited

U.S. PATENT DOCUMENTS

| | | | | |
|---|---|---|---|---|
| 2012/0307656 A1* | 12/2012 | Vyrros | H04L 12/1859 | 370/252 |
| 2012/0311046 A1* | 12/2012 | Grigoriev | H04W 4/12 | 709/206 |
| 2013/0316744 A1* | 11/2013 | Newham | H04M 19/04 | 455/458 |
| 2014/0172992 A1* | 6/2014 | Frederick | H04W 12/06 | 709/206 |
| 2014/0195620 A1* | 7/2014 | Srinivasan | H04L 51/14 | 709/206 |
| 2014/0324973 A1 | 10/2014 | Goel et al. | | |
| 2015/0134761 A1* | 5/2015 | Sharma | H04L 67/26 | 709/207 |
| 2015/0262458 A1* | 9/2015 | Faaborg | G08B 5/228 | 340/539.11 |
| 2015/0277996 A1* | 10/2015 | Bank | H04M 1/72569 | 719/318 |
| 2015/0296043 A1 | 10/2015 | Kim et al. | | |
| 2016/0085594 A1 | 3/2016 | Wang et al. | | |
| 2018/0013851 A1* | 1/2018 | Pollack | H04L 67/2861 | |
| 2018/0192251 A1* | 7/2018 | DeLuca | H04W 76/14 | |

OTHER PUBLICATIONS

Ko, JeongGil; et al.; Sensor Virtualization Module: Virtualizing IoT Devices of Mobile Smartphones for Effective Sensor Data Management; SAGE journals; Internation Journal of distributed Sensor Networks; Jan. 1, 2015; 21 pages.

Kliem, Andreas et al.; The Internet of Things Resource Management Challenge; 2015 IEEE International Conference on Data Science and Data Intensive Systems; Dec. 11-13, 2015; 3 pages.

* cited by examiner

AUTOMATED MOBILE DEVICE NOTIFICATION ROUTING

FIELD

The present invention relates generally to a method for routing communications between devices and in particular to a method and associated system for improving mobile device hardware and software technology associated with communications between hardware devices by automatically routing communications between the hardware devices for improving an efficiency with respect to mobile device communications.

BACKGROUND

Accurately enabling communications between devices typically includes an inaccurate process with little flexibility. Determining communication solutions with respect to routing features of devices may include a complicated process that may be time consuming and require a large amount of resources. Accordingly, there exists a need in the art to overcome at least some of the deficiencies and limitations described herein above.

SUMMARY

A first aspect of the invention provides a mobile device notification improvement method comprising: receiving, by a processor of a notification server hardware device, notification routing data associated with routing notifications to a plurality of hardware devices of a user; receiving, by the processor, a list describing hardware devices of the user; associating, by the processor based on the notification routing data, specified notifications of the routing notifications with specified devices of the plurality of hardware devices of the user; receiving, by the processor, a request for transmitting a notification to the user; analyzing, by the processor based on results of the associating, content of the notification; additionally associating, by the processor, results of the analyzing with the list describing hardware devices of the user; and transmitting, by the processor to a specified hardware device of the plurality of hardware devices based on results of the additionally associating, the notification.

A second aspect of the invention provides a computer program product, comprising a computer readable hardware storage device storing a computer readable program code, the computer readable program code comprising an algorithm that when executed by a processor of a notification server hardware device implements a mobile device notification improvement method, the method comprising: receiving, by the processor, notification routing data associated with routing notifications to a plurality of hardware devices of a user; receiving, by the processor, a list describing hardware devices of the user; associating, by the processor based on the notification routing data, specified notifications of the routing notifications with specified devices of the plurality of hardware devices of the user; receiving, by the processor, a request for transmitting a notification to the user; analyzing, by the processor based on results of the associating, content of the notification; additionally associating, by the processor, results of the analyzing with the list describing hardware devices of the user; and transmitting, by the processor to a specified hardware device of the plurality of hardware devices based on results of the additionally associating, the notification.

A third aspect of the invention provides notification server hardware device comprising a processor coupled to a computer-readable memory unit, the memory unit comprising instructions that when executed by the computer processor implements a mobile device notification improvement method comprising: receiving, by the processor, notification routing data associated with routing notifications to a plurality of hardware devices of the user; receiving, by the processor, a list describing hardware devices of the user; associating, by the processor based on the notification routing data, specified notifications of the routing notifications with specified devices of the plurality of hardware devices of a user; receiving, by the processor, a request for transmitting a notification to the user; analyzing, by the processor based on results of the associating, content of the notification; additionally associating, by the processor, results of the analyzing with the list describing hardware devices of the user; and transmitting, by the processor to a specified hardware device of the plurality of hardware devices based on results of the additionally associating, the notification.

The present invention advantageously provides a simple method and associated system capable of accurately enabling communications between devices.

DETAILED DESCRIPTION

Figure 1:
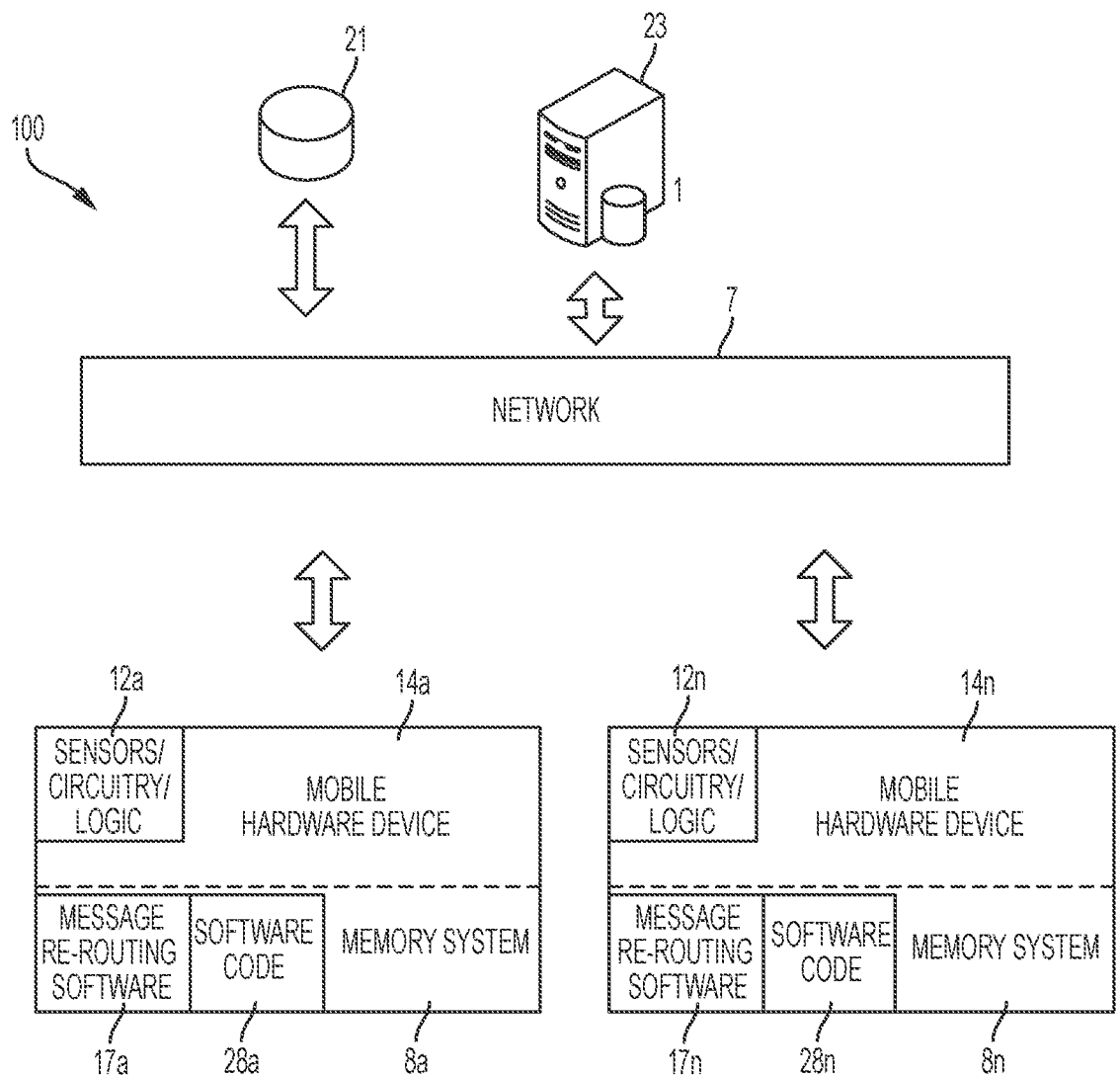
FIG. 1 illustrates a system for improving mobile device technology associated with automatically routing communications between mobile hardware devices, in accordance with embodiments of the present invention.

FIG. 1 illustrates a system 100 for improving mobile device technology associated with automatically routing communications between mobile hardware devices 14a . . . 14n, in accordance with embodiments of the present invention. System 100 is enabled to transmit push notifications to a user mobile device based on user hardware/software related preference of mobile devices such that a specified type of notification is routed (via a network or alternative devices) to a selected user mobile device. System 100 enables the following functionality for routing notifications between mobile hardware devices:

A type of electronic notification is associated with a specified mobile device in response to receiving an indication or signal from the mobile device. Additionally, a plurality of mobile devices may be categorized based on a type of notifications that are respectively associated with each mobile device. Notifications may be associated with a profile for a specified mobile device by sending a query to the specified mobile device in response to a request for confirmation that notifications associated with alternative types of notification are configured to be routed to the specified mobile device.

System 100 of FIG. 1 includes a notification server hardware device (or hardware system) 23 and a database system 21 connected through a network 7 to mobile hardware devices 14a . . . 14n. Mobile hardware device 14a comprises sensors/circuitry/logic 12a and a (specialized) memory system 8a. Memory system 8a comprises a message re-routing software application 17a and software code 28a. Memory system 8a may include a single memory system. Alternatively, memory system 8a may include a plurality of memory systems. Mobile hardware device 14n comprises sensors/circuitry/logic 12n and a (specialized) memory system 8n. Memory system 8n comprises a message re-routing software application 17n and software code 28n. Memory system 8n may include a single memory system. Alternatively, memory system 8n may include a plurality of memory systems. Notification server hardware device 23, database system 21, and hardware devices 14a . . . 14n each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, notification server hardware device 23, database system 21, hardware devices 14a . . . 14n may each comprise a specialized hardware device comprising specialized (non-generic) hardware and circuitry (i.e., specialized discrete non-generic analog, digital, and logic based circuitry) for (independently or in combination) executing a process described with respect to FIGS. 1-6. The specialized discrete non-generic analog, digital, and logic based circuitry (e.g., sensors/circuitry/logic 12a . . . 12n, etc.) may include proprietary specially designed components (e.g., a specialized integrated circuit, such as for example an Application Specific Integrated Circuit (ASIC) designed for only implementing an automated process for improving mobile technology associated with routing communications between hardware devices. Sensors/circuitry/logic 12 may include any type of internal or external sensors including, inter alia, GPS sensors, activity tracking sensors, social network code based sensors, a heart rate monitor, a blood pressure monitor, a temperature sensor, a pulse rate monitor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 enables the following process for routing electronic notifications between mobile hardware devices:

The process is initiated when a mobile device user specifies types of alerts he/she prefers to route between mobile devices. For example, promotional alerts (e.g., There is 10% off today on products), emergency alerts (e.g., Flash flood warning today at 1 pm), sports alerts (e.g., Baseball team A won the world series), traffic alerts (e.g., you will experience traffic on your way to work today), rich notifications (e.g., alerts that contain images/links/audio/etc.), social media alerts (e.g., alerts associated with friends/family and associated posted content), etc. Subsequently, a set of user mobile devices for receiving notifications is determined. For example, a tablet, a phone, a computer, a smart watch, smart glasses, wearable devices, television, etc. At least one mobile device of the set of user mobile devices is matched with the specified types of alerts as determined, supra. For example: send all promotions to Bob's tablet, send all emergency alerts to Bob's phone, etc. Additional preferences and cognitive factors may be considered with respect to routing alerts. For example, a time of day, day of the week, a location of the user (e.g., if away from the house, send promotions to phone and if at the house, send promotions to tablet), a specified percentage based promotion, etc. All preferences are transmitted to a push notification server. In response to receiving the preferences, the push notification server receives a request to transmit a notification and analyzes the content of the notification content to determine a type. For example, a contextual analysis process may be executed via, inter alia, execution of cognitive message analysis techniques, manual topic/keyword selection by notification sender, a historical analysis of messages from sender, etc. The push notification server detects (e.g., via sensors) the user's routing preferences and transmits a notification to associated device IDs relative to an alert type. The notification ios presented to the user via the specified mobile device.

Figure 2A:
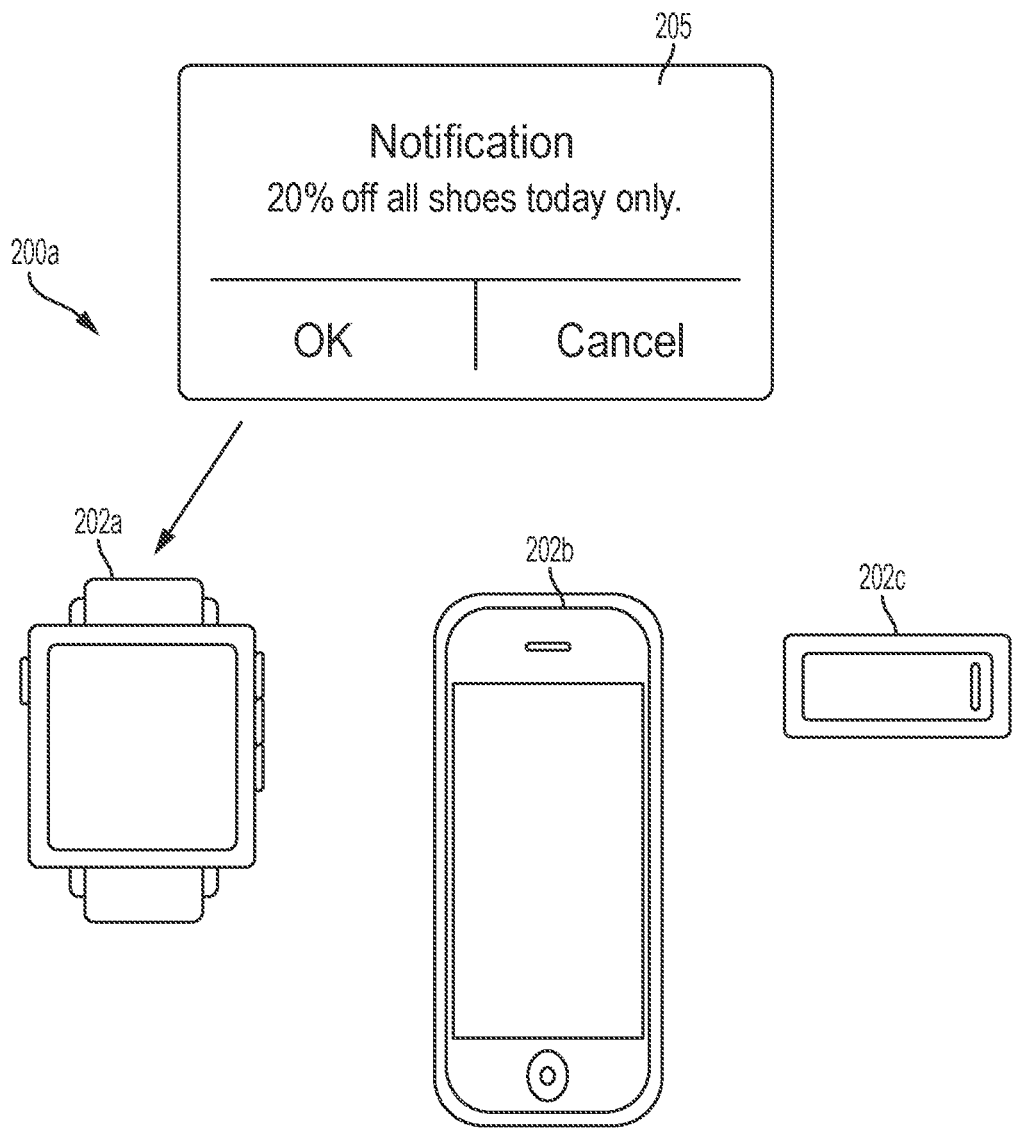
FIG. 2A illustrates a first implementation example enabling a system for routing a specified notification to a single specified device based on digitally detected instructions, in accordance with embodiments of the present invention.

FIG. 2A illustrates a first implementation example enabling a system 200a for routing a specified notification 205 to a specified device of specified devices 202a . . . 202c based on digitally detected instructions, in accordance with embodiments of the present invention. The example illustrated in FIG. 2A transmits a specified notification 205 to only device 202a based on digitally detected instructions specifying an alert applicable to a single device.

Figure 2B:
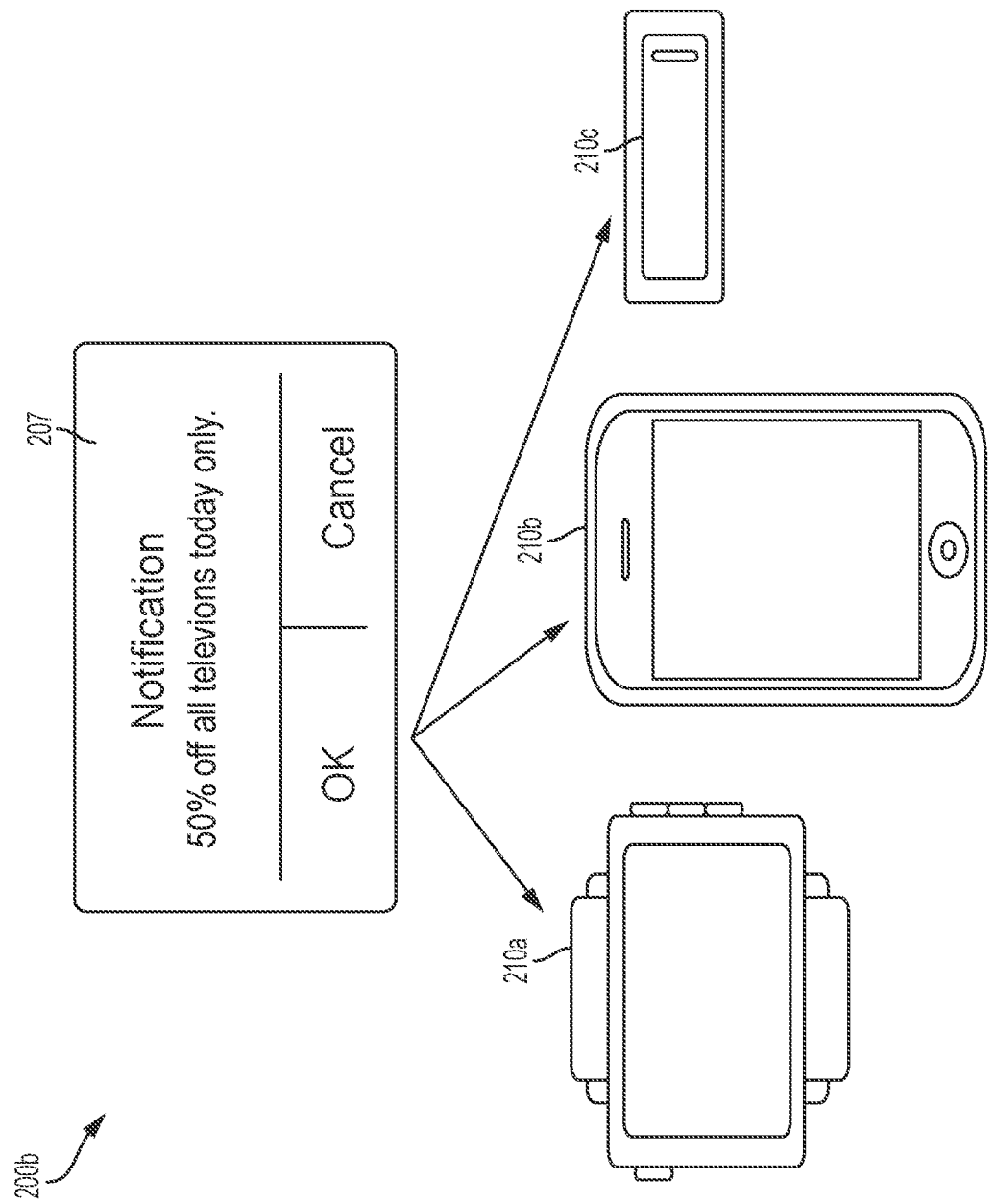
FIG. 2B illustrates a second implementation example enabling a system for routing a specified notification to multiple specified devices of specified devices based on digitally detected instructions, in accordance with embodiments of the present invention.

FIG. 2B illustrates a second implementation example enabling a system 200b for routing a specified notification 207 to specified devices 202a . . . 202c based on digitally detected instructions, in accordance with embodiments of the present invention. The example illustrated in FIG. 2B transmits a specified notification 207 to all of devices 202a . . . 202c based on the digitally detected instructions specifying a high importance alert. Alternatively, devices 202a . . . 202c may be associated with a digitally implemented option to allow all notifications that do not match any of the digital routing instructions to be transmitted to a primary mobile device. Additionally, if a notification is not able to be transmitted to a mobile device (e.g. power to a mobile device is detected to be disabled), the notification may be re-routed to another mobile device. An additional feature for allowing each user profile to set priorities for many mobile devices may be enabled based on an individual notification type. For example, if a promotional notification cannot be delivered to mobile device 210a, the following ordered queue based memory structure (enabled via devices 210 . . . 210c) may be enabled for retransmission: 1—device 210c, 2—device 210b, etc.

Figure 3:
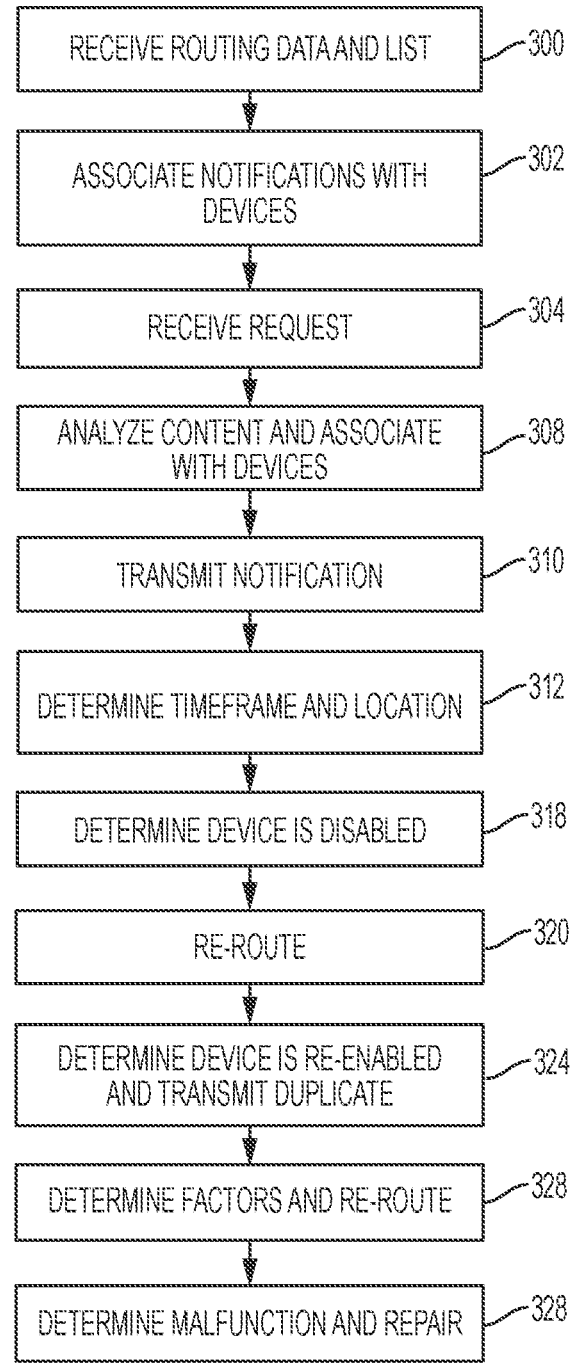
FIG. 3 illustrates an algorithm detailing a process flow enabled by the system of FIG. 1 for improving mobile device technology associated with automatically routing communications between mobile hardware devices, in accordance with embodiments of the present invention.

FIG. 3 illustrates an algorithm detailing a process flow enabled by system 100 of FIG. 1 for improving mobile device technology associated with automatically routing communications between mobile hardware devices, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by notification server hardware device 23, database system 21, and mobile hardware devices 14a . . . 14n of FIG. 1. In step 300, notification routing data associated with routing notifications to a plurality of hardware devices (of a user) is received by a notification server. The notification routing data may include digital instructions for routing the notifications to the plurality of hardware devices based on a notification type. The notification type may include, inter alia, a promotional notification type, an emergency notification type, a sentiment related notification type, an urgency notification type, a vehicular notification type, an audio/video notification type, a contextual notification type, a social media notification type, etc. Additionally, a list describing hardware devices of the user is received by the notification server. In step 302, specified notifications of the routing notifications are associated (based on the notification routing data) with specified devices of the plurality of hardware devices of the user. In step 304, a request for transmitting a notification to the user is received. In step 308, content of the notification is analyzed and results of the analysis are associated with the list describing hardware devices of the user. Analyzing the content may be enabled by the following processes: executing a cognitive analysis algorithm with respect to the notification, executing a keyword analysis with respect to the content of the notification, and/or executing a historical analysis of previous messages of the user with respect to the content of the notification. In step 310, the notification is transmitted to a specified hardware device of the plurality of hardware devices based on results of step 308. In step 312, a specified time frame associated with the request for transmitting the notification to the user is determined. Additionally, a specified location of the user is determined. Step 310 may be further executed based on the specified time frame and/or the specified location. In step 318, it is determined that the specified hardware device is currently disabled. In step 320, the notification is rerouted (in response to results of step 318) to a secondary specified hardware device of the plurality of hardware devices based on said results of step 308. In step 324, it is determined that the specified hardware device has been enabled again and a duplicate of the notification is transmitted to the specified hardware device. In step 328, user based factors associated with the user are determined and the notification is rerouting to a secondary specified hardware device of the plurality of hardware devices based on results of step 308. In step 332 (based on results of step 318 indicating that the specified hardware device is disabled), it is determined that the specified hardware device has malfunctioned and a malfunction type is detected via execution of a plurality of sensors within the specified hardware device. The specified hardware device may be automatically repaired based on the malfunction type. The malfunction type may include hardware based problems with hardware components. For example, the hardware based problems may include, inter alia, open circuit paths, defective components, electrical signal issues, storage issues, cooling hardware issues, etc. Additionally, the malfunction type may include software based problems with the hardware components. For example, the software based problems may include, inter alia, software code issues, software update issues, signal conflicts, computer viruses or malware issues, etc.

Figure 4:
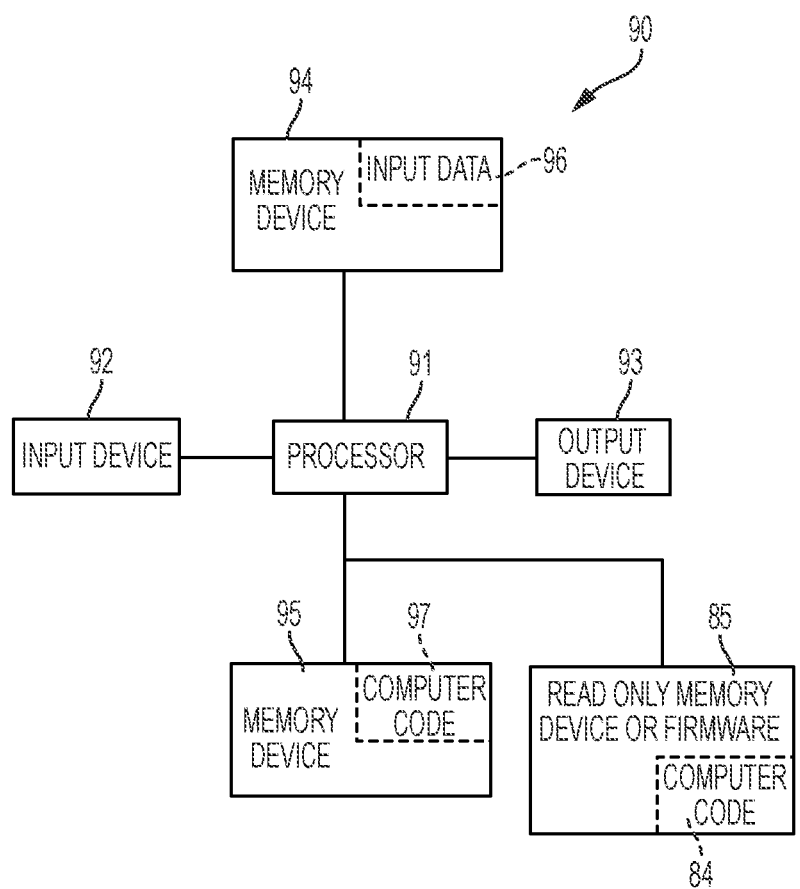
FIG. 4 illustrates a computer system used by the system of FIG. 1 for enabling a process for improving mobile device technology associated with automatically routing communications between mobile hardware devices, in accordance with embodiments of the present invention.

FIG. 4 illustrates a computer system 90 (e.g., notification server hardware device 23, database system 21, hardware devices 14a . . . 14n of FIG. 1) used by or comprised by the system of FIG. 1 for improving mobile device technology associated with automatically routing communications between mobile hardware devices, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/ or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for improving mobile device technology associated with automatically routing communications between mobile hardware devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve mobile device technology associated with automatically routing communications between mobile hardware devices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving mobile device technology associated with automatically routing communications between mobile hardware devices. In another embodiment, the invention provides a business method that performs the process steps of the invention on a subscription, advertising, and/or fee basis. That is, a service supplier, such as a Solution Integrator, could offer to enable a process for improving mobile device technology associated with automatically routing communications between mobile hardware devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
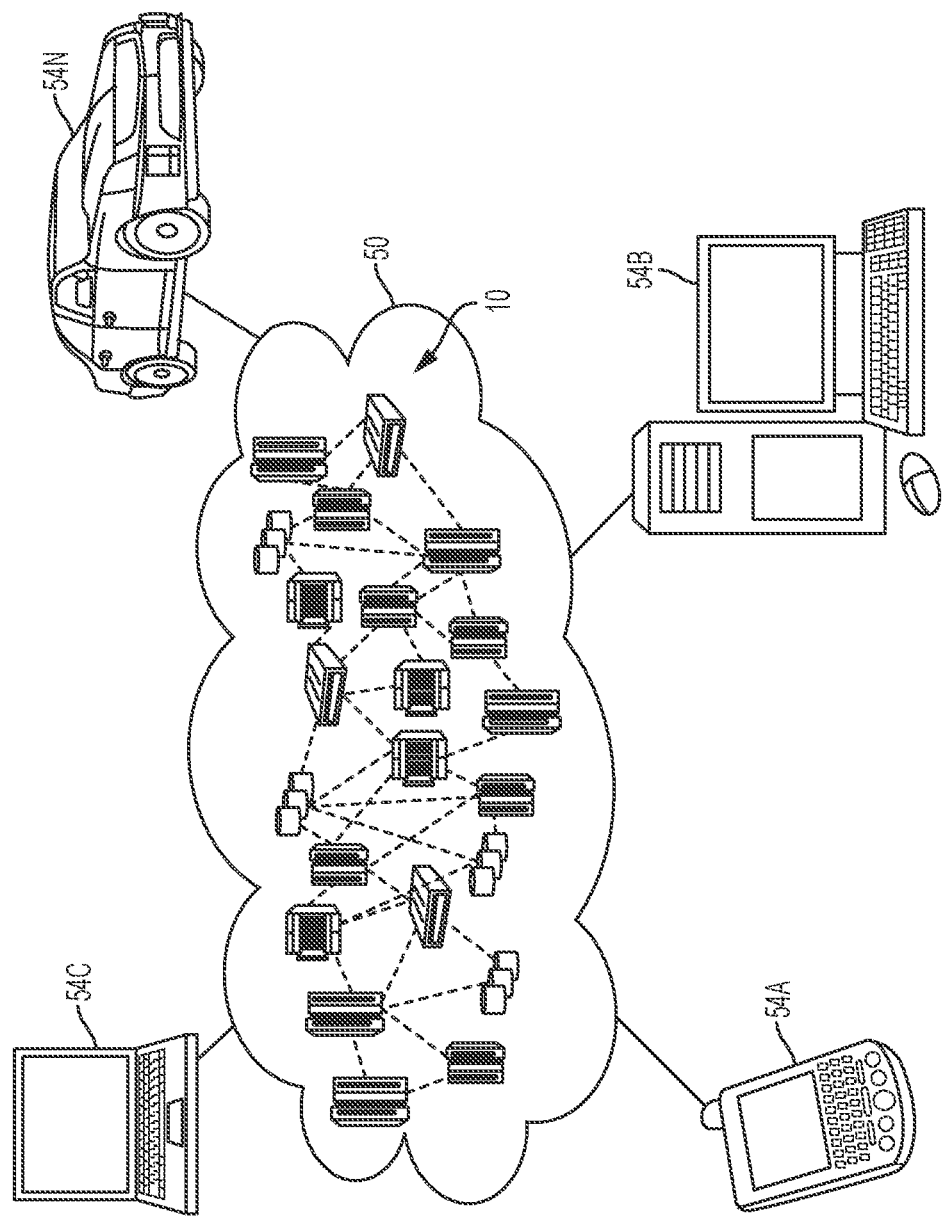
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
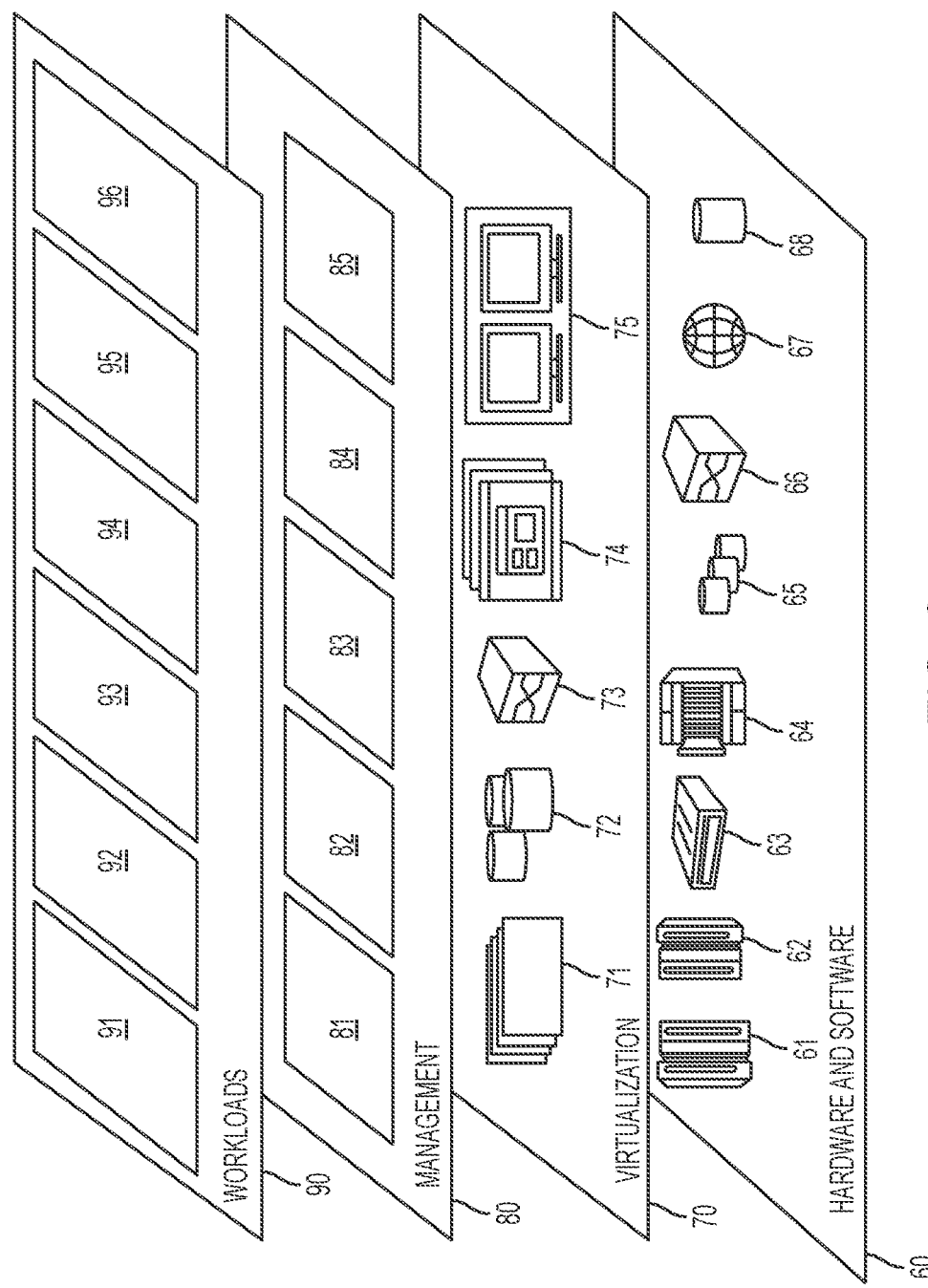
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving mobile device technology associated with automatically routing communications between mobile hardware devices 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A mobile device notification improvement method comprising:
   receiving, by a processor of a notification server hardware device, notification routing data associated with routing notifications to a plurality of mobile hardware devices of a user;
   receiving, by said processor, a list describing said mobile hardware devices of said user;
   querying, by said processor, said plurality of mobile devices to determine that alternative types of notifications are configured to be routed to and between differing devices of said plurality of mobile devices;
   associating, by said processor based on said notification routing data and results of said querying, specified notifications of said routing notifications with specified devices of said plurality of mobile hardware devices of said user;
   receiving, by said processor, a request for transmitting a notification to said user;
   analyzing, by said processor based on results of said associating, content of said notification;
   additionally associating, by said processor, results of said analyzing with said list describing said mobile hardware devices of said user;
   transmitting, by said processor to a specified mobile hardware device of said plurality of mobile hardware devices based on results of said additionally associating, said notification;
   detecting, by said processor via execution of sensors, routing preferences of said user;
   determining, by said processor, that said notification should be rerouted to an additional mobile hardware device of said plurality of mobile hardware devices based on said routing preferences and a specified alert type associated with said notification; and
   enabling, by said processor, a transfer of said notification from said specified mobile hardware device to said additional mobile hardware device.

2. The method of claim 1, wherein said notification routing data comprising digital instructions for routing said notifications to said plurality of mobile hardware devices based on a notification type.

3. The method of claim 2, wherein said notification type is comprises a type selected from the group consisting of promotional notification type, an emergency notification type, a sentiment related notification type, an urgency notification type, a vehicular notification type, an audio/video notification type, a contextual notification type, and a social media notification type.

4. The method of claim 1, further comprising:
   determining, by said processor, a specified time frame associated with said request for transmitting said notification to said user, wherein said transmitting said notification to said specified mobile hardware device is further based on said specified timeframe.

5. The method of claim 1, further comprising:
   determining, by said processor, a specified location of said user, wherein said transmitting said notification to said specified mobile hardware device is further based on said specified location of said user.

6. The method of claim 1, wherein said analyzing said content of said notification comprises:
   executing a cognitive analysis algorithm with respect to said notification.

7. The method of claim 1, wherein said analyzing said content of said notification comprises:
   executing a keyword analysis with respect to said content of said notification.

8. The method of claim 1, wherein said analyzing said content of said notification comprises:
   executing a historical analysis of previous messages of said user with respect to said content of said notification.

9. The method of claim 1, further comprising:
determining, by said processor, that said specified mobile hardware device is currently disabled; and
rerouting, by said processor to a secondary specified mobile hardware device of said plurality of mobile hardware devices based on said results of said additionally associating, said notification.

10. The method of claim 9, further comprising:
determining, by said processor, that said specified mobile hardware device has been enabled; and
transmitting, by said processor to said specified mobile hardware device, a duplicate of said notification.

11. The method of claim 9, wherein results of said determining that said specified mobile hardware device is currently disabled indicate that said specified mobile hardware device has malfunctioned, and wherein said method further comprises:
determining, by said processor via execution of a plurality of sensors within said specified mobile hardware device, a malfunction type; and
automatically repairing, by said processor based on said malfunction type, said specified mobile hardware device.

12. The method of claim 1, further comprising:
determining, by said processor, user based factors associated with said user of said specified mobile hardware device; and
rerouting, by said processor to a secondary specified mobile hardware device of said plurality of mobile hardware devices based on said results of said additionally associating, said notification.

13. The method of claim 1, further comprising:
providing at least one support service for at least one of creating, integrating, hosting, maintaining, and deploying computer-readable code in the notification server hardware device, said code being executed by the computer processor to implement: said receiving said notification routing data, said receiving said list, said associating, said receiving said request, said analyzing, said additionally associating, and said transmitting.

14. A computer program product, comprising a computer readable hardware storage device storing a computer readable program code, said computer readable program code comprising an algorithm that when executed by a processor of a notification server hardware device implements a mobile device notification improvement method, said method comprising:
receiving, by said processor, notification routing data associated with routing notifications to a plurality of mobile hardware devices of a user;
receiving, by said processor, a list describing said mobile hardware devices of said user;
querying, by said processor, said plurality of mobile devices to determine that alternative types of notifications are configured to be routed to and between differing devices of said plurality of mobile devices;
associating, by said processor based on said notification routing data and results of said querying, specified notifications of said routing notifications with specified devices of said plurality of mobile hardware devices of said user;
receiving, by said processor, a request for transmitting a notification to said user;
analyzing, by said processor based on results of said associating, content of said notification;
additionally associating, by said processor, results of said analyzing with said list describing said mobile hardware devices of said user;
transmitting, by said processor to a specified mobile hardware device of said plurality of mobile hardware devices based on results of said additionally associating, said notification;
detecting, by said processor via execution of sensors, routing preferences of said user;
determining, by said processor, that said notification should be rerouted to an additional mobile hardware device of said plurality of mobile hardware devices based on said routing preferences and a specified alert type associated with said notification; and
enabling, by said processor, a transfer of said notification from said specified mobile hardware device to said additional mobile hardware device.

15. The computer program product of claim 14, wherein said notification routing data comprising digital instructions for routing said notifications to said plurality of mobile hardware devices based on a notification type.

16. The computer program product of claim 15, wherein said notification type is comprises a type selected from the group consisting of promotional notification type, an emergency notification type, a sentiment related notification type, an urgency notification type, a vehicular notification type, an audio/video notification type, a contextual notification type, and a social media notification type.

17. The computer program product of claim 14, wherein said method further comprises:
determining, by said processor, a specified time frame associated with said request for transmitting said notification to said user, wherein said transmitting said notification to said specified mobile hardware device is further based on said specified timeframe.

18. The computer program product of claim 14, wherein said method further comprises:
determining, by said processor, a specified location of said user, wherein said transmitting said notification to said specified mobile hardware device is further based on said specified location of said user.

19. The computer program product of claim 14, wherein said analyzing said content of said notification comprises:
executing a cognitive analysis algorithm with respect to said notification.

20. A notification server hardware device comprising a processor coupled to a computer-readable memory unit, said memory unit comprising instructions that when executed by the computer processor implements a mobile device notification improvement method comprising:
receiving, by said processor, notification routing data associated with routing notifications to a plurality of mobile hardware devices of a user;
receiving, by said processor, a list describing said mobile hardware devices of said user;
querying, by said processor, said plurality of mobile devices to determine that alternative types of notifications are configured to be routed to and between differing devices of said plurality of mobile devices;
associating, by said processor based on said notification routing data and results of said querying, specified notifications of said routing notifications with specified devices of said plurality of mobile hardware devices of said user;
receiving, by said processor, a request for transmitting a notification to said user;

analyzing, by said processor based on results of said associating, content of said notification;

additionally associating, by said processor, results of said analyzing with said list describing said mobile hardware devices of said user;

transmitting, by said processor to a specified mobile hardware device of said plurality of mobile hardware devices based on results of said additionally associating, said notification;

detecting, by said processor via execution of sensors, routing preferences of said user;

determining, by said processor, that said notification should be rerouted to an additional mobile hardware device of said plurality of mobile hardware devices based on said routing preferences and a specified alert type associated with said notification; and enabling, by said processor, a transfer of said notification from said specified mobile hardware device to said additional mobile hardware device.

* * * * *